Feb. 1, 1955    J. R. OISHEI ET AL    2,700,785
WINDSHIELD WIPER BLADE
Filed April 16, 1952
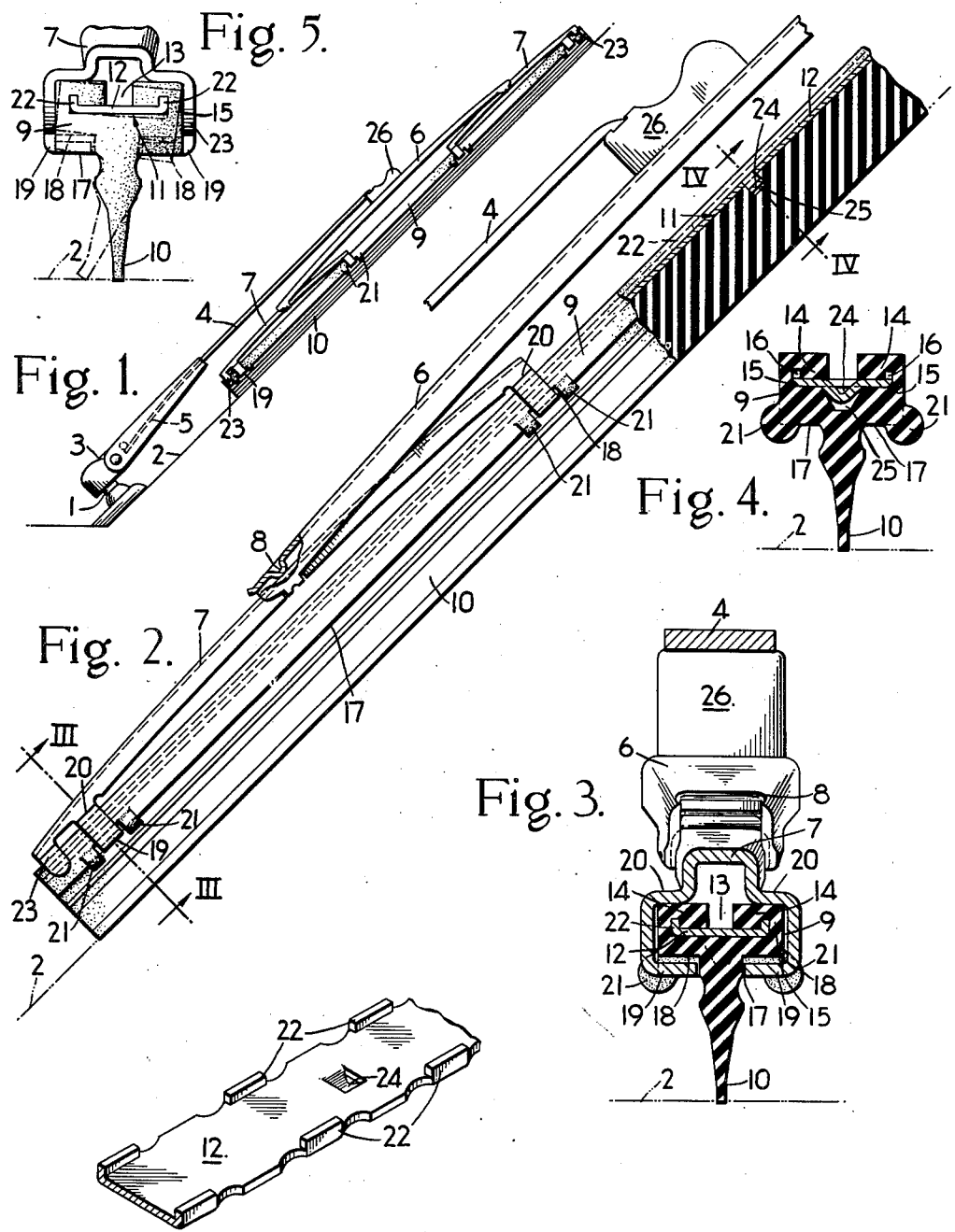
INVENTORS
JOHN R. OISHEI AND ANTHONY C. SCINTA
BY
Bean, Brooks, Buckley & Bean.
ATTORNEYS United States Patent Office 2,700,785
Patented Feb. 1, 1955

2,700,785

WINDSHIELD WIPER BLADE

John R. Oishei and Anthony C. Scinta, Buffalo, N. Y., assignors to Trico Products Corporation, Buffalo, N. Y.

Application April 15, 1952, Serial No. 282,292

14 Claims. (Cl. 15—245)

This invention relates to windshield wipers and especially to a wiper for the cleaning of curved surfaces and embodying a flexible backing which acts under the urge of an actuating arm to compel the surface-conformance of the wiping edge.

The primary object of the invention is to provide a wiper for curved shields which is quiet and efficient in operation and which presents a minimum surface area to the lifting action of the wind currents, thereby reducing the tendency of the wiper to lift and consequently fail in its wiping function.

A further object is to provide a wiper construction in which the blade element is readily adapted for molding in accordance with modern methods.

Another object of the construction is to provide a wiper so designed as to eleminate the interference with its wiping performance by the impact or jamming of snow about its wiping lip and within its holder.

A further object is to embed the metal holder at its points of engagement with the blade to thus insure against the metal scratching the glass surface under conditions, such as an out of line mounting of the arm bearing shaft, which ordinarily will permit the blade to rotate abnormally in one direction to the end that the metal holder can, under a wet-dry condition of the glass, be drawn down into an undesired contact with the glass.

A still further object is to protect the relatively fragile or distortable flexible backing, normally used to reinforce the rubber element. This is accomplished here by positioning the reinforcing backing member of flexible material entirely within the confines of a rugged molded rubber back portion of the blade for two purposes, namely, the protection of the delicate flexible strip, and the removal of the edges of the strip from contact with the glass.

Again, the invention has for its object to provide a blade in which control of the blade rotation about its longitudinal axis may be resiliently maintained and limited through a metal to rubber contact for confining the rolling action of the blade when operated sidewise. This arrangement serves to minimize operational noises so much accentuated in the earlier constructions where metal contacts metal.

The above objectives have been accomplished by providing a rubber element having a backing chamber readily moldable to effect a firm interlock with the backing throughout the length of the blade portion, the backing being insertible endwise to interlock the two parts on either side together with no hazard of the blade unwrapping itself from its anchoring part. In the manner described the assembly of the blade is made by first sliding or positioning the blade rubber section through the straddling claws of the holder to compress the rubber so as to anchor the blade in recesses or seats provided for the claws. When the blade is thus positioned in the holder the backing strip is inserted in the nature of a spline endwise, to thus support the blade against subsequent releasing compression. This interlocks the blade and the holder as a unit without clamps, sufficient clearance being provided in the seats to permit the wiping element to slide as required when the element is flexed during surface-conformance.

The foregoing and other objects will manifest themselves as this description progresses wherein reference is made to the accompanying drawing in which:

Fig. 1 is a side elevation of the improved wiper mounted on a windshield;

Fig. 2 is an enlarged view of a portion of the wiper;

Figs. 3 and 4 are transverse sectional views about on lines 3—3 and 4—4 of Fig. 2;

Fig. 5 is an end elevation of the wiper with part of the pressure distributor omitted; and Fig. 6 is a detailed perspective view of the medial portion of the backing strip.

Referring more particularly to the accompanying drawing, the numeral 1 designates the wiper actuating shaft that is journaled at the lower side of the windshield 2 and carries a wiper arm 3 having a hinged outer section 4 which is urged by a spring 5 to press a connected wiper against the windshield surface, all in a well known manner.

The wiper showing, by way of example, comprises a squeegee or blade, a backing therefor, and a pressure distributing superstructure or mount embodying a bridge 6 with terminally carried rockers or secondary bridges 7 each pivotally connected at 8 intermediate its ends.

The blade which is formed of rubber, either natural or synthetic, has its body 9 provided with a laterally flexible wiping edge or lip 10 and is itself chambered at 11 lengthwise to receive the backing 12. To facilitate its molding, the body is preferably made with an open back, as indicated at 13, through which the mold core may be supported. This provides opposing anchor ribs or flaps 14, each overhanging the chamber 11 from a respective side wall 15 thereof and being undercut, as at 16, to impart a broad shallow U-shape to the chamber in cross section. The body of the blade is relatively wide to provide lateral shoulders 17 that overhang the opposite sides of the wiping lip. The undersides of the shoulders are recessed at intervals to form seats 18 for the reception of the straddling claw extensions 19 of the presser feet 20 that depend from the opposite ends of the rockers 7, the feet and their extensions providing terminal claws that operatively support the blade unit 9, 12. The recesses are of sufficient depth to provide ample clearance to enable the blade to rock laterally a predetermined extent on the underfaces of the presser feet for assuming the proper dragging position. The presser feet seat upon the anchor flaps or ribs 14 under the spring urge that is applied by the wiper arm.

The flexible backing 12 is in the form of a spring strip having upstanding retainer lugs 22 arranged at intervals along its opposite margins to engage in the undercut grooves 16 and interlock with the internal anchor ribs 14 for holding them against accidental release. For this reason the ribs are made heavy and substantial to withstand the lateral tug imposed by the wiping lip during the sweep of the blade across the windshield surface. The tendency for the rubber body to roll about its flexible backing results in a downward pull upon the forward side of the blade to cause the adjacent anchor rib to engage the lugs more firmly, the two ribs being pulled upon alternately as the wiper is oscillated. The lugs may, if desired, have their upper edges left with a ragged surface to embed or snag more intimately into the rubber. The length of the lugs is such as not to substantially detract from the flexibility of the strip so that the latter, under the urge of the arm spring, will compel surface-conformance of the wiping lip while affording lateral stability and support to the flexible elongate blade. It will be noted that during the rocking of the blade upon the supporting underfaces of the presser feet the shoulders 17 will lower to protect the glass surface from becoming scratched by the claw extensions 19. As an added precautionary measure, the opposite side walls or shoulders of the recesses 18 may be provided with guards in the form of knobs 21.

The remote ends of the rockers 7 may carry auxiliary presser feet 23 to supoprt the squeegee unit, comprising the blade and its backing, and preclude its projecting ends lifting from the glass. These auxiliary pressers straddle the unit to guide as well as hold the ends in alinement but preferably are without claw extensions. To prevent unauthorized endwise displacement, the flexible backing strip is interlocked with the blade in a positive manner, as for example by pressing a lug 24 from the medial portion to engage in a keeper recess 25 in the blade. An attaching clip 26 is provided on the pressure applying and distributing bridge 6 for mounting the wiper on its actuating arm.

In assembling the parts of the squeegee unit on the pressure distributor, the blade alone is threaded lengthwise between the claws of each pair to engage the latter in their seats for interlocking the oppositely facing shoulders or side edges of the claws between the shoulders of the recesses 18, such sliding action being facilitated by slightly compressing the rubber to pass the knobs 21 through the claws when necessary. Thereafter, the backing strip is inserted endwise through an open end of the chamber 11 and as it slides in between the straddling claws it will serve to brace the body portion against collapse as well as to support the body against displacing flexure and thereby secure the interlock between the claws and the rubber blade. The placement of the backing strip therefore serves a dual purpose in that it locks the blade in position and provides a reinforcement for the blade that is surface-conforming but laterally stable. The backing strip 12 may be made of light metal or other suitable material and suitably reinforced by a strip of spring material to create a laminated structure.

The wiper is free from objectionable operational noises since the presser feet and their claw extensions ride upon the rubber material of the blade and therefore have a sliding cushioned contact, playing back and forth during the surface conforming action by reason of the elongation of the seats 18 lengthwise of the wiper, as shown in Fig. 2. The rubber anchorage to the backing strip is sure since the downward pull on the rubber is actually against the interlocking lugs 22, and the anchor ribs are of sufficient body to maintain their interlock with them.

The foregoing detail description has been given for clarity and not by way of limitation since the inventive principles involved are capable of assuming other physical embodiments without departing from the spirit of the invention and the scope of the appended claims.

What is claimed is:

1. A surface-conforming wiper for curved windshield surfaces, comprising an elongate flexible blade body having a longitudinal wiping lip and a backing chamber extending lengthwise of the lip, a longitudinally extending bridge having terminal pairs of pressure applying feet with claw extensions straddling and grasping the body about the chamber, said body and feet having interlocking shoulders interengaged by an initial deforming compression followed by an expansion to normal of the chambered body to effect the interlock, and a flexible backing arranged in the chamber to stiffen said body sidewise for maintaining said shoulders interengaged and operable to compel surface-conformance of the wiping lip by said pressure applying feet.

2. A windshield wiper comprising an elongate blade body having a longitudinally extending wiping edge and a backing chamber therefor, and a backing arranged in the chamber for effecting conformance to a curved surface under the pressure of a supporting structure, said backing having a series of upstanding anchor lugs, and said backing chamber having a wall recess formation receiving the anchor lugs.

3. A windshield wiper comprising an elongate body having a wiping edge along one longitudinal margin and a relatively heavier opposite margin, said body having side recesses, a pressure applying structure arranged over the opposite margin lengthwise thereof and having longitudinally spaced pairs of presser feet means straddling the opposite margin and interlocking in the body recesses, said opposite margin being channeled lengthwise and providing a collapsible chamber to detachably interlock with the straddling feet means, and a flexible backing strip inserted endwise in the chamber and supporting the same against collapse to maintain the interlock.

4. A windshield wiper for curved glass, a blade element having a wiping edge and a relatively larger back portion provided with a continuous slotted opening extending through the back wall of said element and opening into a backing chamber extending transversely of the blade and in turn opening into a pair of perpendicular marginal slots at right angles to the walls of the transverse chamber, a reinforcing flexible backing strip having two upturned interrupted longitudinal edges, said upturned edges being employed to interlock the blade element and the backing strip throughout their length.

5. In a windshield wiper for curved glass, a blade element having a reduced wiping lip and a relative broader back portion, the back portion having a vertical slot extending longitudinally of the blade and connecting with a transverse chamber opening into two upstanding marginal slots at an angle to the transverse chamber walls, an elongated flexible backing strip having two upturned interrupted margins formed at an angle to the transverse section of the backing strip, the blade and the backing strip being interlockingly connected to each other as a unit; bridge means supporting the blade and its backing strip longitudinally to apply pressure thereto to cause the wiping lip to follow the contour of the glass and to flex in conformity thereto.

6. A windshield wiper for curved glass, comprising a wiper element having a reduced wiping lip, an elongated flexible backing strip, said element having a chamber extending longitudinally thereof and provided with an angularly related slot, said strip having an angularly related margin engaged in the slot whereby the related angles of the two serve to interlock them into a unit flexible in a plane substantially perpendicular to the surface of the glass while being laterally substantially rigid, the element having a series of longitudinally spaced apart anchoring points in its outer margins, and pressure distributing bridge means including parts to connect the element to the said bridge means to cause the wiping lip of the element to follow the contour of the glass when moved across the surface to be wiped.

7. In a windshield wiper for curved glass, a wiper blade element having a flexible wiping lip along one longitudinal margin and a back portion, a pair of transversely alined longitudinal anchoring grooves of angular formation extending substantially throughout the length of the element, and elongated laterally rigid backing means having angular margins engaging in the anchoring grooves to unite the element and backing means into a unitized longitudinally interlocked assembly for synchronous flexing of the parts to conform to the curvature of the curved glass to be wiped, said backing means serving to hold the element against lateral flexing thereof.

8. In a windshield wiper for curved glass, a wiper blade element having a flexible wiping lip along one longitudinal margin and a back portion, a pair of transversely alined longitudinal anchoring grooves of angular formation extending throughout the length of the element, elongated laterally rigid backing means having angular portions engaging in the anchoring grooves to unite the element and backing means into a unitized longitudinally interlocked assembly for synchronous flexing of the parts to conform to the curvature of the curved glass to be wiped but being rigid against lateral flexing thereof, and bridge means straddling the wiper element, including spaced apart longitudinally positioned presser parts, the bridge means acting to apply pressure to the extremities of the wiper element at longitudinally spaced points to cause said flexing.

9. In a windshield wiper for curved glass, a bridge having pivotally mounted link means thereon, a wiper element including a wiping lip and a back portion, said back portion having an elongated slot extending substantially centrally of its side margins and opening into a wider chamber, the chamber having extension slots extending at right angles from its side margins, a flexible backing means transversely rigid and having vertically extending interrupted flanges for interlocking engagement in the extension slots, the wiper element and backing means constituting a continuous integral assembly laterally self-supporting but flexible to receive and distribute pressure from the bridge means to cause the wiping lip to follow the contour of the glass, the outer margins of the said wiper element being provided with a series of anchoring portions interlocked with the link means to limit the endwise movement of the wiper element and to control the rotational movement about its longitudinal axis.

10. A wiper for curved windshields, comprising a rubber blade having a wiping lip and a back portion with an embedded flexible backing strip providing a surface-conforming support for the wiping lip, the back portion overhanging the opposite sides of the wiping lip to provide lateral shoulders each having a series of recesses for loosely receiving the mounting claws of a pressure applying mount whereby said blade will rock in said mounting claws in operation thereof.

11. A wiper for curved windshields, comprising a rubber blade having a wiping lip and a back portion with an embedded flexible backing strip providing a surface-conforming support for the wiping lip, the back portion overhanging the opposite sides of the wiping lip to provide lateral shoulders each having a series of recesses, and a pressure applying mount having spaced sets of blade-straddling presser feet, the feet having claw extensions loosely engaged in the recesses to enable the blade to rock upon the presser feet, the lateral shoulders extending at a level below the level of the claw extensions.

12. A wiper for curved windshields, comprising a rubber blade having a wiping lip and a back portion with an embedded flexible backing strip providing a surface-conforming support for the wiping lip, the back portion overhanging the opposite sides of the wiping lip to provide lateral shoulders, a pressure applying mount having spaced sets of blade-straddling presser feet, the feet having claw extensions engaging the lateral shoulders, and guard-serving enlargements on a side of the blade to protect the windshield surface from contact by the claw extensions on such side.

13. A wiper for a curved windshield surface, comprising a flexible blade having a wiping lip along one longitudinal margin and a backing chamber for the lip, a flexible backing lying in the chamber and having greater width than thickness with its width dimension extending transversely of the blade for imparting lateral stability and surface-conforming flexure to the blade responsive to pressure of a supporting structure, the chamber having a flap overlying the backing, said backing and said overlying flap having interengaging shoulders to hold the backing in the chamber.

14. A wiper for a curved windshield surface, comprising a flexible blade body having a narrow wiping lip and a wide back, both extending lengthwise of the blade body, said wide back having a longitudinally extending medially positioned narrow chamber having its width extending transversely across the major portion of said back, said back being longitudinally slit from its outer portion to said chamber to form liftable flaps which may be lifted for insertion and removal of a backing strip, said chamber being defined by bottom, top and side walls, said top and bottom walls of said chamber being substantially thicker than said side walls, and a backing strip substantially corresponding in shape to said chamber lying within said chamber and substantially abutting throughout their extent said side walls and said thicker bottom and top walls, said strip imparting lateral stability and surface-conforming flexure to said blade responsive to pressure of a supporting structure.

References Cited in the file of this patent

UNITED STATES PATENTS

| | | |
|---|---|---|
| 2,543,383 | Scinta et al. | Feb. 27, 1951 |
| 2,548,090 | Anderson | Apr. 10, 1951 |
| 2,589,339 | Carson | Mar. 18, 1952 |
| 2,596,063 | Anderson | May 6, 1952 |

FOREIGN PATENTS

| | | |
|---|---|---|
| 454,332 | Canada | Jan. 25, 1949 |